Dec. 17, 1935.  A. E. DRISSNER ET AL  2,024,278
COLLAPSIBLE PIPE TAP
Filed March 26, 1935   7 Sheets-Sheet 1

Inventors
Alfred E. Drissner
William J. Hogg
By their Attorney

Dec. 17, 1935.  A. E. DRISSNER ET AL  2,024,278
COLLAPSIBLE PIPE TAP
Filed March 26, 1935   7 Sheets-Sheet 4

Inventors,
Alfred E. Drissner
William J. Hogg
by their Attorney

Dec. 17, 1935.  A. E. DRISSNER ET AL  2,024,278
COLLAPSIBLE PIPE TAP
Filed March 26, 1935   7 Sheets-Sheet 5

Inventors,
Alfred E. Drissner
William J. Hogg
by their Attorney

Dec. 17, 1935.  A. E. DRISSNER ET AL  2,024,278
COLLAPSIBLE PIPE TAP
Filed March 26, 1935   7 Sheets-Sheet 6

Inventors
Alfred E. Drissner
William J. Hogg
by their Attorney

Patented Dec. 17, 1935

2,024,278

UNITED STATES PATENT OFFICE 2,024,278

COLLAPSIBLE PIPE TAP

Alfred E. Drissner and William J. Hogg, Cleveland, Ohio, assignors to The National Acme Company, Cleveland, Ohio, a corporation of Ohio Application March 26, 1935, Serial No. 13,106

23 Claims. (Cl. 10—145)

This invention relates to taps, particularly to pipe taps adapted for the threading of large pipes such as oil-well pipes usually having a diameter of about six to fourteen inches, the object of the invention being to provide an improved collapsible or receding pipe tap having automatically shiftable circular cutters or chasers for cutting a tapered pipe thread and which tap is simple in construction and efficient in operation.

A further object is the provision of an improved tap of the type specified in which the chasers or cutters are positively and, therefore, more efficiently controlled especially during their receding movements, thereby insuring that each chaser will do an equal amount of cutting and be prevented from pulling away from the core piece and so take a heavier cut whereby a better tapered and smoother thread is obtained, and in which the tap has a minimum number of parts and yet a large range so that a number of different tapers can be readily obtained and also a fine adjustment of taper by the mere manipulation of very simple adjusting means.

A further object of the invention is the provision of an improved tap of the type described and having interchangeable nose pieces whereby a varying number of chasers or cutters may be used according to the size of pipe to be threaded.

In the drawings accompanying and forming a part of this specification.

Fig. 7 is a bottom view of Fig. 6.

Similar characters of reference indicate corresponding parts in the several views.

Before explaining in detail the present improvement and mode of operation thereof, we desired to have it understood that the invention is not limited to the details of construction and arrangement of parts illustrated in the accompanying drawings since the invention is capable of other embodiments, and that the phraseology which we employ is for the purpose of description and not of limitation.

The tap is rotated by any suitable source of power and is fed forward in the way usual in taps of this type although the work may be rotated relative to the tap.

Figure 1:
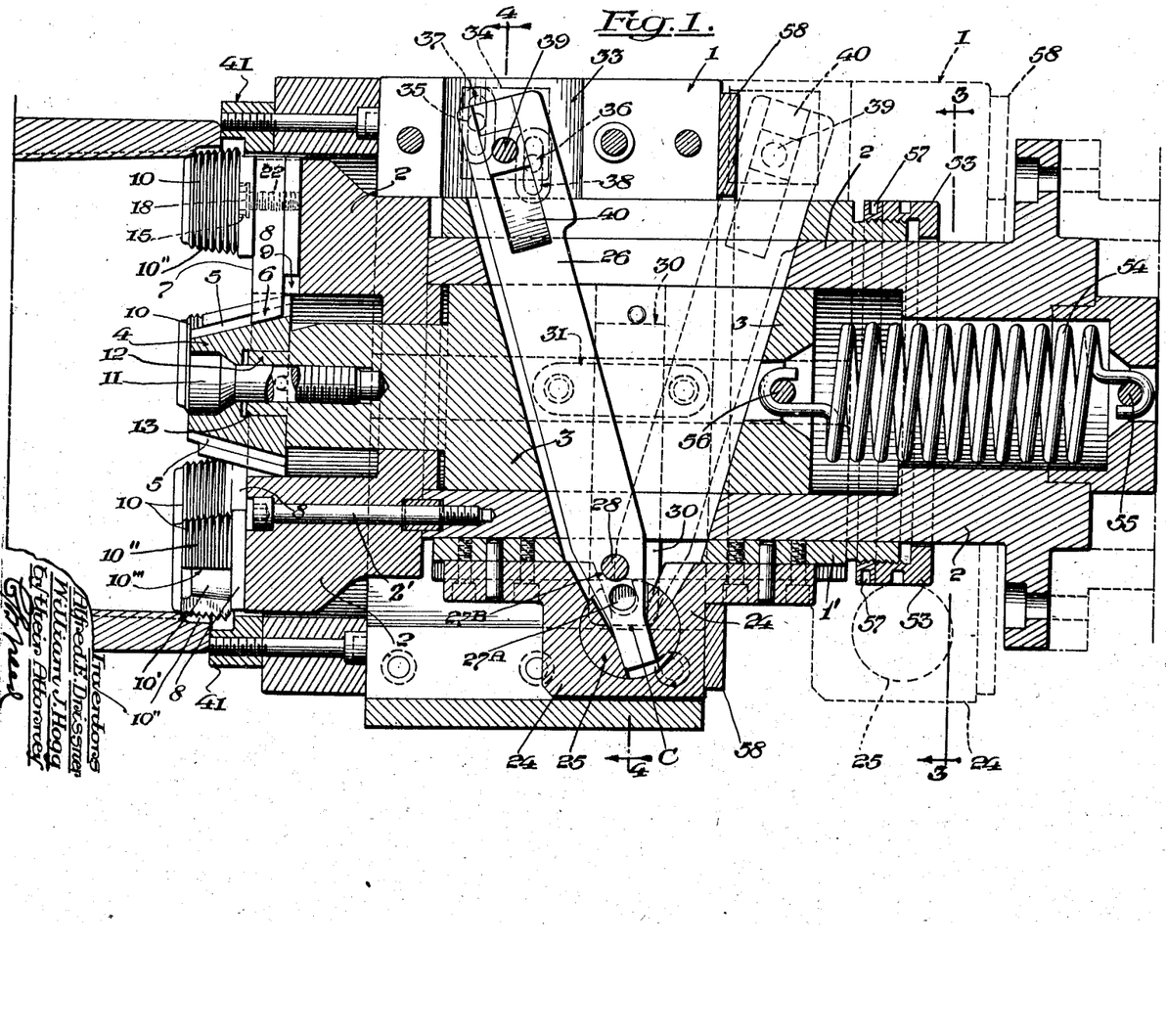
Fig. 1 is a longitudinal sectional view of this improved pipe tap.

This improved tap, in the preferred form thereof, comprises a housing 1 within which is located a sleeve 1' and within this sleeve is a body or sleeve 2 having a head detachably bolted thereto by bolts 2' (Fig. 1) and both which head and sleeve are herein referred to as the body or sleeve 2.

Within this sleeve or body 2 is a core member or shank 3, on the forward end of which is a hardened tapered core 4 provided with lengthwise extending slots 5 of angular form cooperating with similarly formed interlocking slots 6 on the inner ends 7 of the sliding chaser blocks 8 located circularly around the hardened core 4 and carried at the forward end of the sleeve 2.

These sliding blocks 8 on which the chasers are located have their interlocking grooves 6 machined to fit closely in the slots 5 in the core 4 so that the inward and outward movements of the chasers are controlled in a positive manner and thus a better taper is obtained, also a better form and smoothness of thread, as each chaser will be doing an equal amount of cutting and cannot pull away from the core and take a heavy cut.

The chaser blocks 8 are suitably supported in radial recesses 9 of the sleeve or body head 2 for radial shiftable or sliding movement by the tapered core 4, being interlocked with that core in the manner just described.

Mounted upon each of the radially shiftable blocks 8 is a circular cutter or chaser 10.

The tapered core 4 is interchangeable and is, therefore, detachable from the core member or shank 3, being suitably secured thereto by a bolt 11 and a projection or pilot 12 formed on the end of the core shank 3 to engage a similar machined opening 13 on the interior of the core 4 (see Fig.

Figure 2:
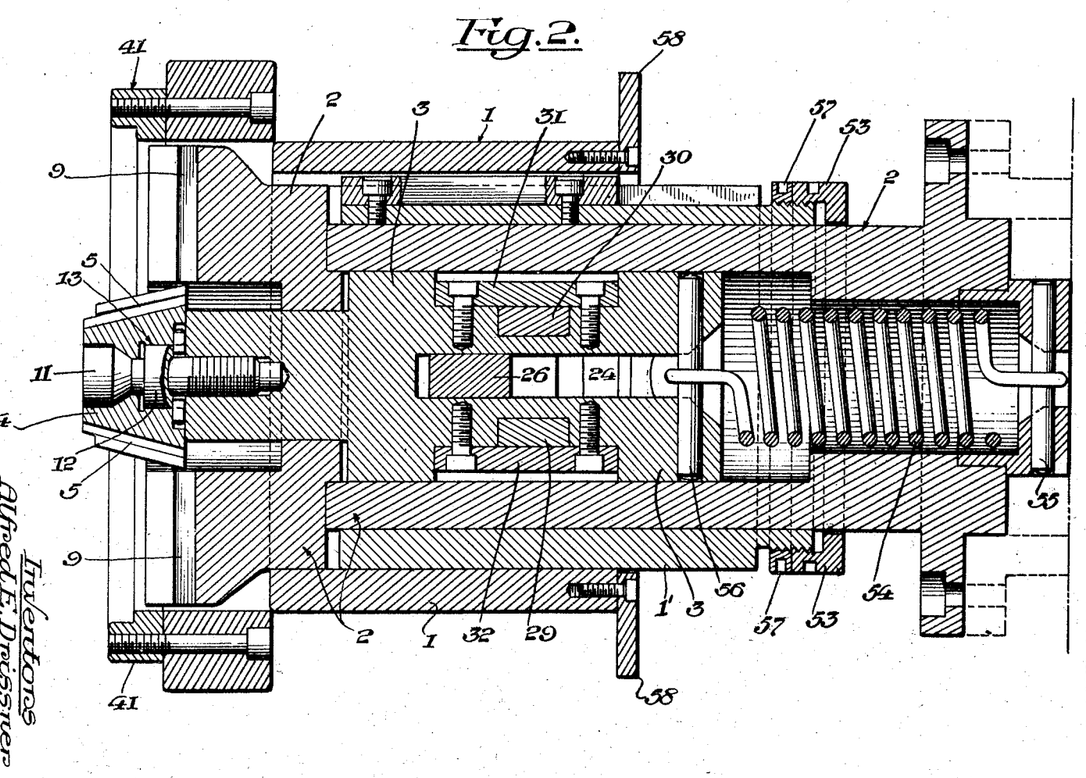
Fig. 2 is also a longitudinal sectional view at right angles to Fig. 1.
Figures 2, 6, 8:
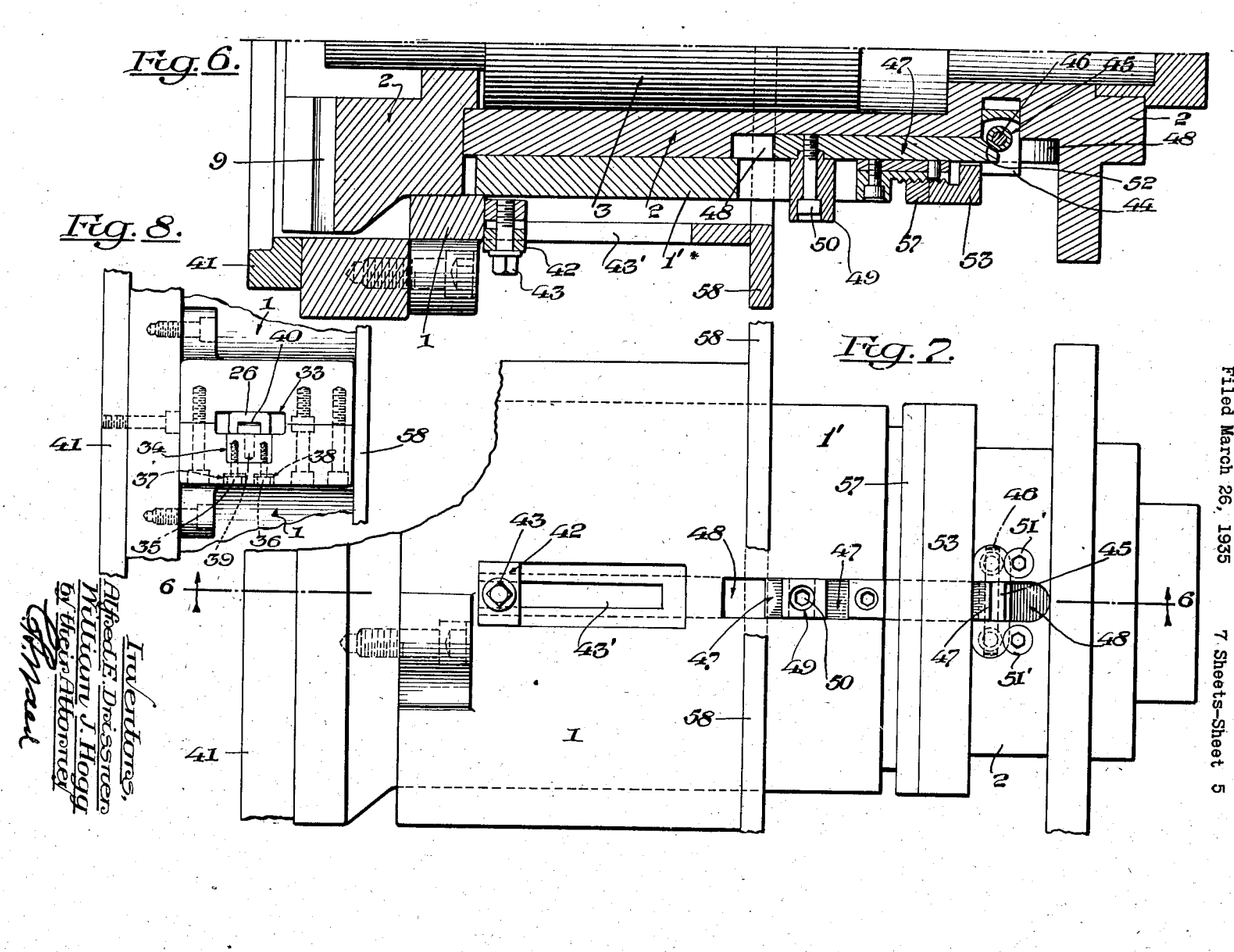
Fig. 6 is a longitudinal sectional view taken on line 6—6 of Fig. 7.
Fig. 8 is a detail top view of a part of Fig. 1.
Figure 9:
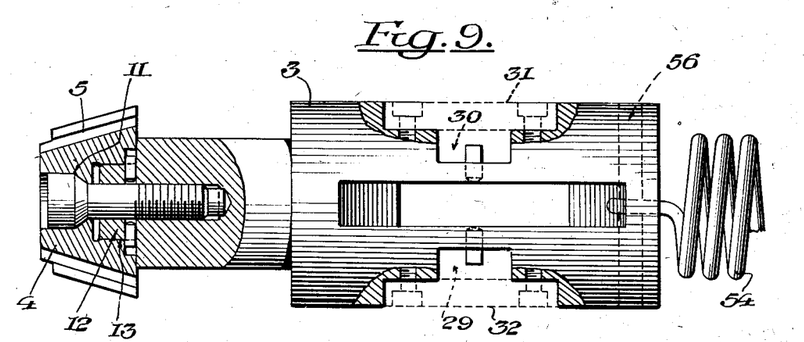
Fig. 9 is a view of the core member or shank with the front end thereof in section.

2), whereby the tapered core 4 is properly and accurately set and held against independent rotation by suitable interlocking means such as pins carried by the core (see Fig. 9).

By means of the interchangeable and detachable core 4, various sizes of cores may be used, thereby permitting any desired number of circular chasers to be used.

Figure 16:
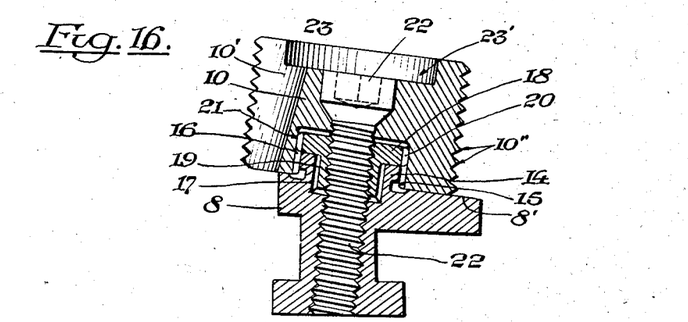
Fig. 16 is a sectional view of a chaser mounted on its block.

The front face of each supporting block 8 is inclined transversely thereto as at 8' (see Fig. 16), whereby the chasers will be angularly set or inclined to the front face of the tap body so that, while the grooves of the chasers are cut circularly straight and not spirally, they yet have the effect of spirally cut grooves, this inclination of the supporting blocks 8 thus being formed on an angle with relation to the front face of the tap body giving the proper angular setting to the circular chasers and controlling the proper cutting edge and clearance thereof.

Figure 5:
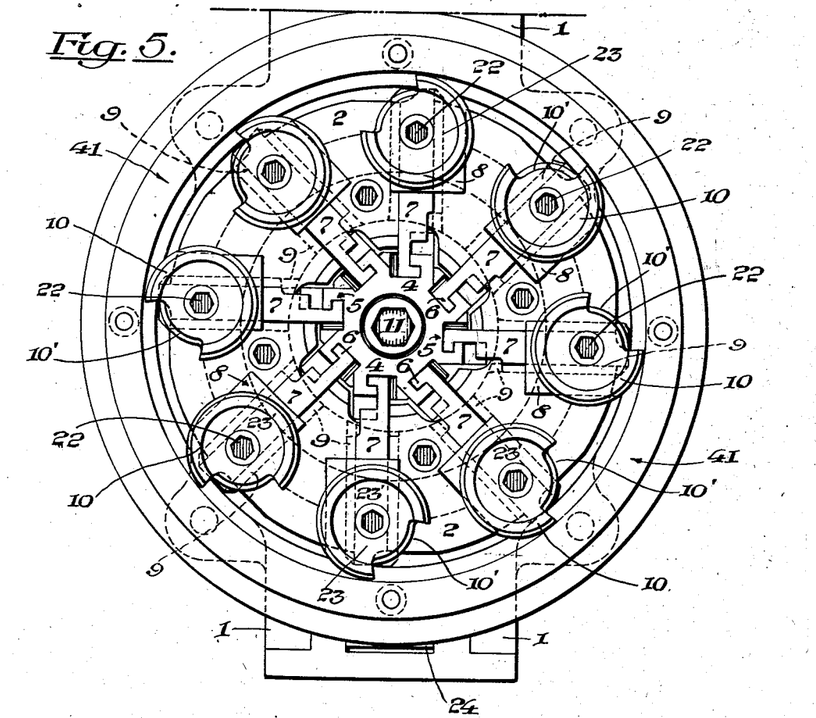
Fig. 5 is a front end view of this improved tap.

Each of the chasers or cutters 10 is substantially circular but with a segmental or sectional part 10' (see Figs. 1, 5, and 16) thereof removed, and has substantially straight parallel grooves 10'' cut therein instead of spiral threads, and these grooves terminate in a depthwise cutting edge 10'''.

Each circular chaser is cut or shaped to the corresponding taper of the part to be threaded. By locating the chaser in an angular position on the chaser block, a proper clearance and lead for the thread is obtained and by using this angular location of the chaser, the chasers can be ground independently and not in sets of four or more which would be necessary were the chasers provided with spiral grooves. In other words, if the chasers were provided with spiral grooves, this would require that the entire set of chasers be ground on the cutting edge exactly the same to secure the proper cutting position, and it is practically impossible for any operator to adjust them correctly.

All of the chasers of a set are formed exactly the same but the heighth from the rear face at the point of the cutting edge will vary so that, in manufacturing these chasers, all of the chasers are machined exactly the same until the last operation when the back faces of the chasers are ground to suit the position of the cutting edge and, consequently, the position of the circular chaser end-wise will always remain the same with relation to the top point of the thread. This is a very important point for, without this, the structure would be too complicated for the average operator to set and impractical for general use. After this grinding, the top faces and chamfers of all of the chasers of the set are ground off exactly alike so that the chasers will all start to cut at the same time.

The grinding of the back face of the chaser in relation to the circular grooves depends upon the number of chasers used in the tap. For instance, if four chasers are used, the distance between the ground back face of the chaser to the center of the groove varies one-fourth of the distance between the grooves. Where six chasers are used, the distance between the grooves or pitch is divided by six, etc.

When milling or grinding the chaser grooves, the blanks are rough milled and when they are finish ground, the grinding operation compensates for the slight error in lead and form.

The lower diameter at the bottom of the chaser is greater than the diameter at the top or counter-bored section. This difference in diameter of the chaser is predetermined according to the pitch of the thread to be cut and the diameter of the work being threaded in order to keep the diameter of the circular chaser as large as possible. Therefore, to obtain the proper position of the chasers, each chaser is ground during the last operation on its back face to suit the particular position of the cutting edge in the tap body, a little more being ground off the back of one chaser than off the back of another (See Figs. 12 to 15). This grinding, however, is in a perfectly straight direction or plane and does not give the angularity of the chaser relative to the tap body as this is obtained by the angularity of the front face of the chaser blocks, but it does give the different positions of the chasers (as shown in Figs. 12 to 15, wherein it will be noted that, in Fig. 12, the distance between the lines 1—2 is less than it is between the lines 3—4 in Fig. 15, the letters A and B showing how the grinding gradually varies in the several chasers of the set).

The front face of each chaser block may be provided, in practice, centrally thereof with a forwardly extending, exteriorly ground ring or annular flange or pilot 14 (see Fig. 16), for the reception of a similarly formed interiorly ground surface 15 located on the outer or rear side of the serrations 16 of the chaser 10. These two ground surfaces form means for properly positioning and supporting the chaser on the block and this pilot is ground closely to fit within the chaser and is provided with a circular serrated opening 17 for the reception of a stepped serrated bushing 18 having a set of serrations thereon, for instance 1/64th of an inch apart as at 19. This bushing also has an integral part of larger diameter in front thereof having serrations thereon, for instance $\frac{1}{32}$nd of an inch apart as at 20. The chaser 10 has its back face provided with a serrated circular opening 21 corresponding to the serrations of the larger bushing and these several parts, the chaser, the detachable and rotatable two-section bushing and the chaser block are secured together by a screw or bolt 22 having a counter-bored front end for the reception of a suitable tool to release the chaser from its block, the screw being left-handed whereby the cutting of the chaser will tighten the screw. By means of this or a similar combination of serrations, not only is the setting and grinding of the chaser facilitated but the turning of the chaser on its block is prevented. The front face of the bushing may be suitably graduated to facilitate the setting of the parts.

It will be understood, of course, that as each chaser is successively ground, it is moved around the serrations to bring the cutting edge thereof to the proper point. Thus, the serrated bushing acts as a means on which the circular chaser is mounted on the one-piece chaser block and insures that the cutting edge of the chaser will be set in the proper position for cutting.

Each chaser is preferably counter-bored at its front end, as at 23, forming a flanged chamber 23' and this not only provides a chip clearance when the chaser is cutting but permits the proper grinding of the chaser so that it will cut properly. The cut-away or removed segmental portion 10' along the length of the chaser forms a cutting edge with which the counter-bored front end intersects while the serrated opening in the back of the chaser is of less diameter than the counter-bored opening and does not intersect the cutting edge.

From the foregoing, it will be seen that if a bushing were used having only one set of serrations, for instance, 1/32nd of an inch apart, which would be necessary in order that they not be too fine to support the chaser, then the chaser would have to have its cutting edge ground off 1/32nd of an inch each time it was ground, but by having a bushing of two diameters with different circumferentially spaced or graduated serrations, the result is that if, for instance, the number of serrations on the smaller bushing is less or approximately one-half of the number of serrations on the larger bushing, the chaser can be ground off 1/64th of an inch each time instead of 1/32nd of an inch.

In setting the chaser to a new position, the bushing is moved clock-wise one serration in the chaser block. The chaser is then set back anti-clockwise one serration. Now, if the smaller bushing has thirty serrations and the larger has forty serrations, this eliminates a full serration movement. In other words, there is a ratio of practically four to one.

It will thus be seen that an improved tap is provided having circular chasers of improved form and construction together with improved means for supporting them, which supporting means includes means for predetermining the exact amount to be ground off the chaser at each grinding thereof while insuring not only long life to the chaser but an accurate setting of the chaser to correspond with such grinding.

Among the numerous advantages of this improved circular chaser is not only the longer life thereof as compared with the ordinary form of chaser because there are quite a few inches of periphery provided for grinding, but the chaser grooves can be readily circularly ground, the cutting edge is protected when the die is collapsed as the cutting edge is rolled away from the chip instead of dragging through and the heat is carried away from the cutting edge rapidly due to the large cross section of the chaser. The chaser can be readily made in a screw machine and has a natural clearance similar to a milled chaser. No backing off is required. The cutting edge can be readily sharpened and the chaser can be readily taken out and returned, and there is a reduction in the stock or number of chasers required to be carried on hand. Furthermore, the chasers can be used for right and left hand threads by simply changing the angle of the chaser block slide opposite to that for right hand thread cutting. It will be understood, of course, that the coarseness of the grooves of the circular chaser can be varied as may be desired.

The lever mechanism

Figures 10, 11:
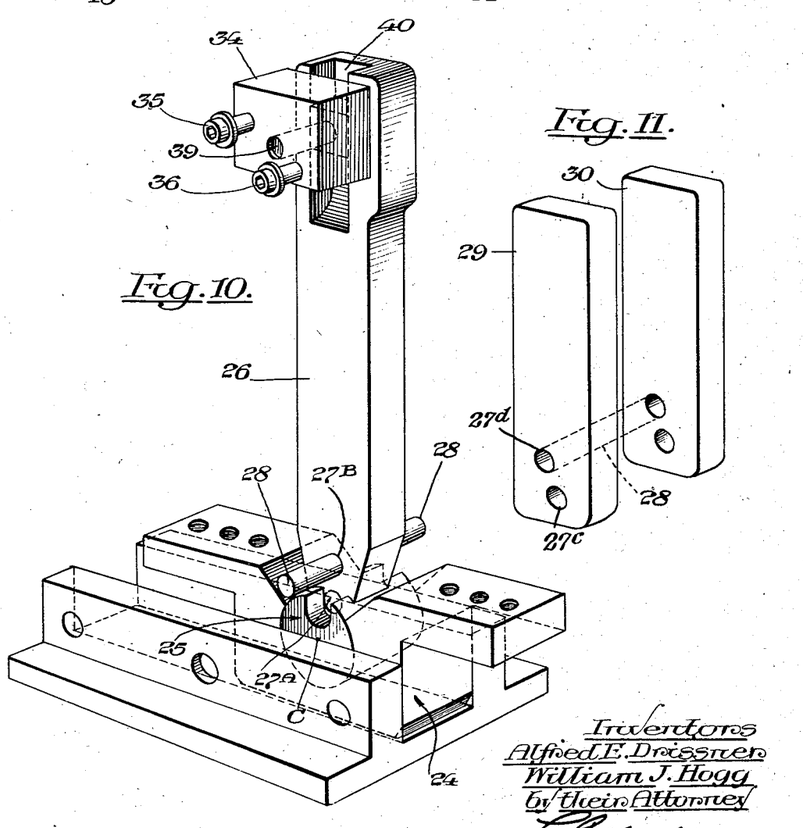
Fig. 10 is a perspective view of the lever mechanism.
Fig. 11 is a perspective view of the bar members attached to the lever shown in Fig. 10.
Figure 12:
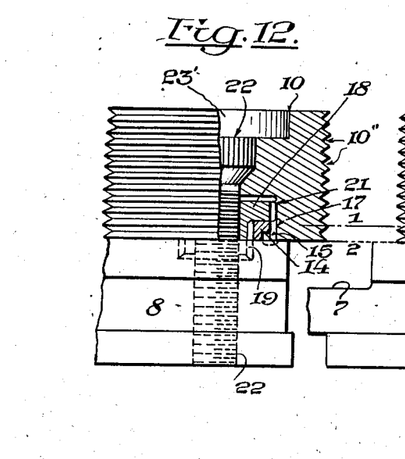
Figs. 12, 13, 14 and 15 are partly sectional views of the chasers and their blocks illustrating the angular position or setting of the chasers with relation to each other.
Figure 13:
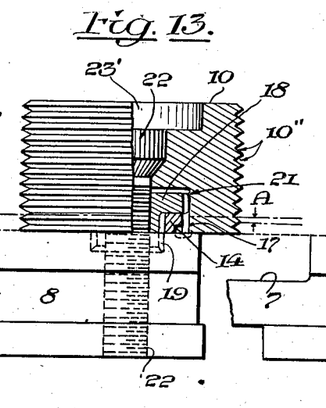
Figure 14:
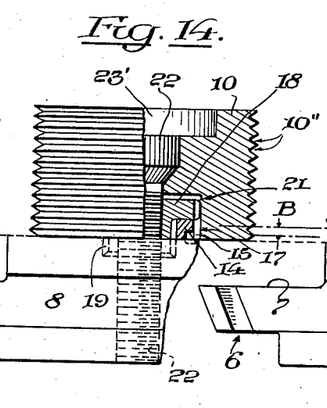
Figure 15:
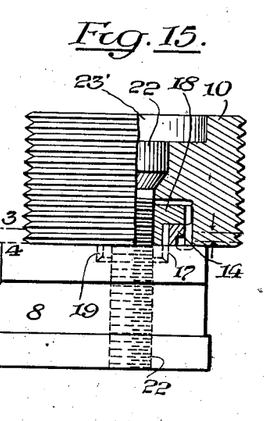

As the sleeve or body 2 is fed forward with its chaser 10, the sleeve 1' is carried along and the chasers 10 are fed into the work or pipe to be threaded. On this sleeve 2 is attached a yoke 24 (see Figs. 1 and 10). In this yoke 24 is located a swiveled disk 25 and in this disk is mounted the end of a lever 26, the inner end of which is turned round to fit into a hole in this swiveled disk 25.

In this lever are two holes 27—A and 27—B, one or the other carrying a pin 28. This pin extends through two arms or bars 29 and 30 having openings 27c and 27d corresponding to those in the lever 26 (see Figs. 10 and 11), and these arms are secured to the core shank 3 by two clamps 31 and 32 (see Figs. 2 and 9).

Figure 3:
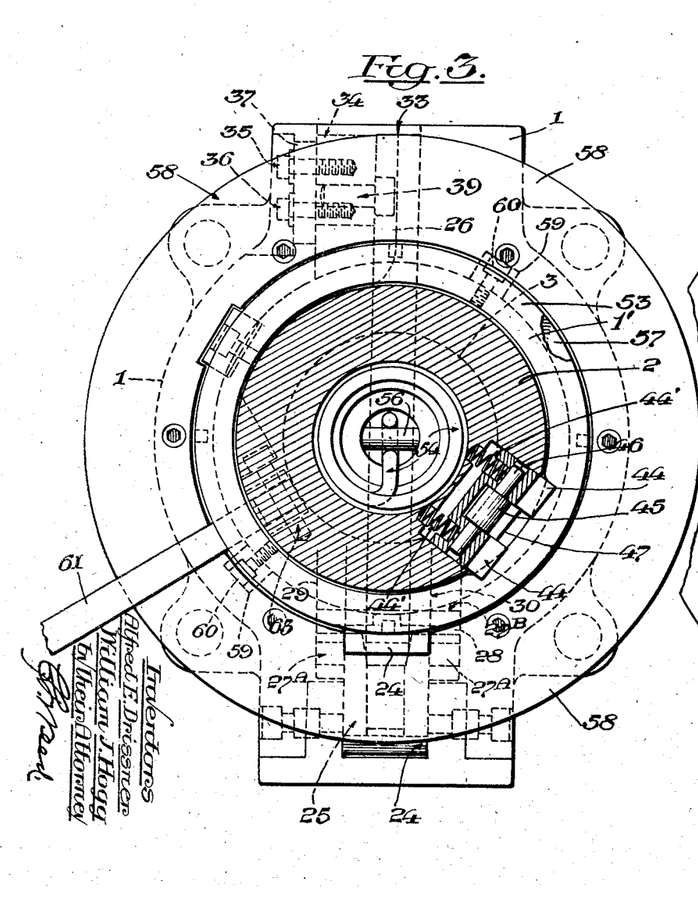
Fig. 3 is an end view partly in section, the section being taken on line 3—3 of Fig. 1.
Figure 4:
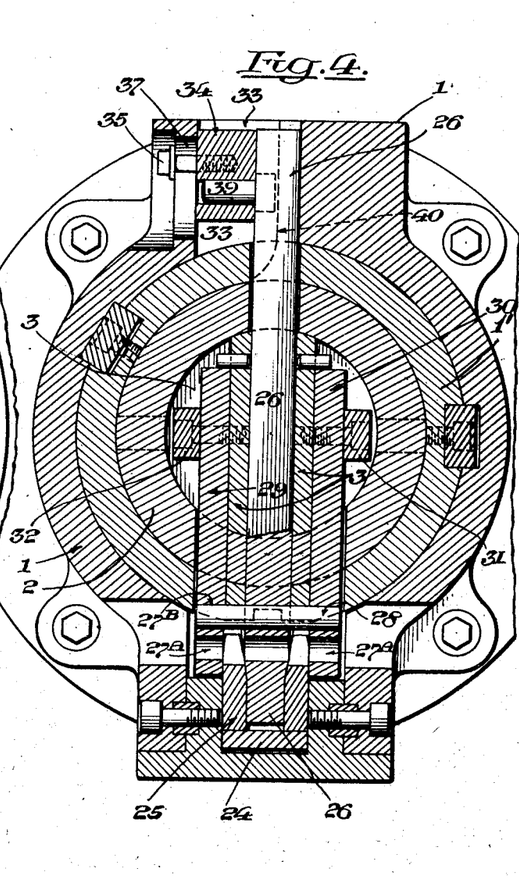
Fig. 4 is a cross sectional view taken on line 4—4 of Fig. 1.

To obtain a correct taper the full length of the thread, it is necessary that the control points of the lever 26 travel in parallel lines with the center of the tap. Therefore, at the upper end or top pivot point of the lever 26, the housing 1 is provided with a slot 33 (see Figs. 1, 3, 4 and 8) for the reception of a block 34 (see Fig. 10), which block is secured to the housing by screws 35 and 36 projecting through and working in elongated slots 37 and 38 in the housing (see Figs. 1, 3 and 4).

In the block there is a pin 39 having a round shank and a square head and this round shank allows the pin to pivot on its own center while the square head fits into a long slot 40 (see Fig. 10) in the lever 26. Thus, although the end of the lever 26 moves in an arc, the control point 15 or pin 39 moves in a parallel line with the center line or axis of the tap.

The center C of the disk 25 is held in the same position and only has a circular motion while the tap is threading so that the distance from the center C of the disk 25 to the center line or axis of the tap does not change.

As the lever 26 swivels on its pin 28 located in either of the holes 27—A or 27—B, this pin does not change its position relative to the axis or center line of the tap but moves in a straight line with the axis and as the lever moves on this pin located in either of the holes 27—A or 27—B the cylindrical end of the lever fitting in the hole of the swivel disk 25, moves in an arc, but the end of this lever 26 can move endwise in the hole of the swivel disk. The pin 28 in either hole 27—A or 27—B also moves in a parallel line with the center line or axis of the tap as it is held in position by its fitting into the holes of the arms 29 and 30.

Thus, as the tap is fed into the work, the described parts will not change their relative positions until the trip ring 41 carried at the front of the housing 1 contacts with the face of the pipe, coupling or work to be threaded. Any mechanical means can be used to stop the forward travel of the housing 1 in place of the trip ring 41.

As the tap keeps feeding into the work, with the housing 1 stopped, the end of the lever 26 at point 39 is stopped causing the pin 28 in either of the holes 27—A or 27—B to slow up its forward travel in the ratio of the difference in the spacing of the pin 39 to the pin 27—A or 27—B and center of the swiveled disk 25 at C. This, in turn, holds back the forward travel of the arms 29 and 30 and core shank 3 together with the tapered core 4. When the core 4 and its shank 3 are thus held back from the full forward travel of the tap body 2, the chaser blocks 8, together with the chasers 10 are allowed to push toward the center by the cutting action and if the cutting action does not accomplish this, the blocks are pulled in toward the center of the tap by the interlocking connections between the blocks 8 and the core 4, thereby obtaining a tapered thread.

The tapers, threaded with this particular tap the way it is shown, are .0625" included taper per 1", or .03125" included taper per 1".

The core piece 4, as shown in the drawings, has a taper ½" included taper to 1". This is eight times the taper for .0625" included taper to 1", and sixteen times the taper for .03125" included taper to 1". That is usually required on taper pipe threads. Therefore, the ratio of the difference from the pivot point 39 to pivot point C of the lever 26 will, in practice, be sixteen times the distance from point C to the pivot point 27—A and eight times the distance from point C to pivot point 27—B. Therefore, as the tap feeds into the work, the core 4 is held back when threading (.0625" taper per inch threads) 1/8" for every 1" the chasers are fed into the work and, when threading (.03125" taper per inch threads) the core piece is held back 1/16" for every 1" that the chasers are fed into the work.

With this lever type of control, by having two or more holes as 27—A and 27—B for the location of the pin 28 in the lever 26 and arms 29 and 30 of the core piece 3, a number of tapers under positive control and also a very fine adjustment of taper can be obtained by merely loosening the two screws 35 and 36 and moving the block 34 so as to adjust the pin 39 at the outer end of the lever.

To obtain the proper control of the taper action through the lever and tapered core, the action has been so designed that the ratio of movement is accurate from the start of the threading to the finish thereof. This is obtained by keeping the control and locating points of the lever in proper location. As will be observed, the three points are always equidistant from the axis of the tap, and the three points are always in line with each other.

The tripping means

To collapse the chasers out of the threaded work when the required length of thread has been cut, a trip dog 42 is provided secured to the housing 1 by a screw 43. This dog and screw can be adjusted in an elongated slot 43' to provide for various lengths of thread (see Fig. 6).

As shown in the drawings, the dog is set to cut the maximum length which is approximately 5 3/4" on this size of tap.

The body or sleeve 2 carries a spring actuated trip dog 44 having a roller 45 mounted on a pin 46 and these parts hold a trip plunger 47 back in a suitable slot 48.

On this trip plunger 47 is a block 49 secured in place by a screw 50 and this block 49 contacts with the dog 42 as the tap feeds into the work so that, when the required length of thread has been cut, the dog 42 contacting with the block 49 stops the forward travel of the trip plunger 47 and when this trip plunger is stopped, the beveled end 52 of the plunger 47 rides on the roller 45 and thereby forces the trip dog 44 inward until it passes the inner ends of an adjusting ring 53 mounted on the end of the sleeve 1' and thereby allows this adjusting ring, and thereby the sleeve 1' of the tap to be pulled back by the tension spring 54. This spring is held by a pin 55 in the body and by a pin 56 in the core shank 3.

This tension spring 54 thus pulls back the core shank 3 and with it the arms 29 and 30, pin 28, end of the lever 26, swiveled disk 25, yoke 24 and sleeve 1'. The tap is now tripped and can be removed from the work.

When the core shank 3 is pulled back, the core 4 is also drawn back and as the chaser blocks 8 are interlocked with the core 4, these blocks and the chasers carried thereby are drawn in toward the center of the tap.

On this size of tap, the core 4 moves back 3/4" on collapsing action and this draws each chaser block 8 inward 3/16" which is more than enough to clear the threads in the piece.

Taper adjusting means

The adjustment for taper from 3/8" taper per foot to 3/4" taper per foot is obtained simply by transferring the pin 28 from the hole 27—A to hole 27—B in the arms 29 and 30.

Fine adjustment for taper can be made by changing the position of the block 34 in the housing 1. We have designed this part so as to move this block 34 1 1/8" on this size of tap and this 1 1/8" movement allows us to move the block outward and get a greater ratio from point 39 to C relative to points 27—A or 27—B, and by moving the block 34 inward, we get a lesser ratio from point 39 to point C relative to points 27—A or 27—B. This, of course, changes the taper and in this size of tap for 3/8" taper we get a fine adjustment of .0032" on 3/8" taper per inch and .0064 adjustment on 3/4" taper per inch threads.

This fine adjustment is desirable as some customers desire to hold the adjustment to a plus dimension and others to a minus; also variations in taper for various reasons can be taken care of.

Diameter adjusting means

Adjustment for diameter is obtained by moving the threaded adjusting ring 53 held in place by a lock nut 57 on sleeve 1'. The tension spring 54 by means of the core shank 3, the arms 29 and 30, yoke 24 and sleeve 1' holds the adjusting ring 53 back against the dog 44 and thus maintains these parts in proper co-operative relation.

When the adjusting ring 53 is turned, this permits the sleeve 1' together with the yoke 24, arms 29 and 30, core shank 3 and core 4 to change relative positions to the chaser blocks 8 and when the core 4 changes its position with its tapered slots interlocked with the tapered slots of the chaser blocks 8, these blocks are necessarily adjusted inwardly or outwardly.

The adjustment on these taps is approximately .062 large and small or 1/8" full adjustment in diameter.

Resetting means

When the tap has cut the thread and the chasers or cutters have receded or collapsed out of the thread, the tap can be brought out of the pipe or coupling and this same motion can be used to reset the tap.

A fork or some other stop can be attached to the machine so that the rearward travel of the housing 1 is stopped. A plate or ring 58 is shown secured to the housing 1 for the fork or stop to contact with. As the tap moves out or rearward, a closing block 59 secured to the sleeve 1' by screws 60 contacts with this plate 58. This causes the sleeve 1' to move into position to allow the trip block 44 to be reset by its springs 44' but this block is not allowed to be forced out too far by reason of the screw heads 50'.

As before stated, the coil spring 54 holds the adjusting ring 53 back against the trip block 44 by means of the sleeve 1', yoke 24, arms 29 and 30 and core shank 3.

Figure 17:
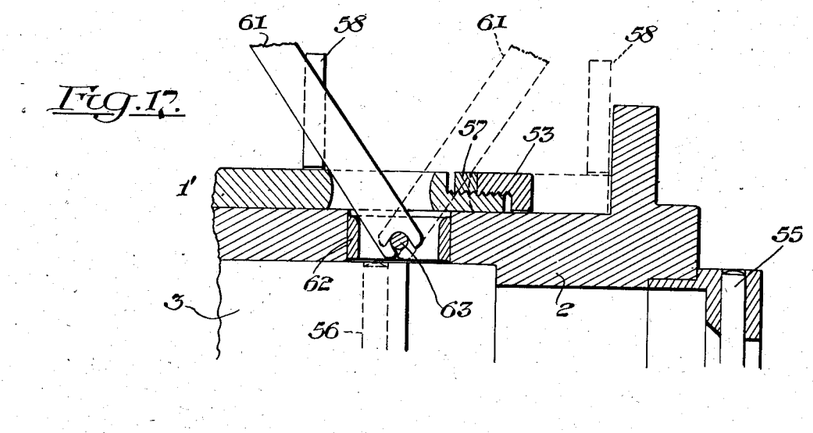
Fig. 17 is a partial longitudinal section through the hand setting mechanism shown in Fig. 3.

The tap can also be reset by a hand resetting lever 61 inserted through an elongated slot in the housing 1 and an elongated slot in the sleeve 1' and into a bushing 62 carrying a pin 63 of the sleeve 2 (see Fig. 17). The lever has a slot in the end to slip over the pin 63 and this makes a pivot for the lever 61 to act against the end of the elongated slot in the sleeve 1' so that pressure on the lever will cause the sleeve 1' to move into position in order to allow the trip block to reset itself.

From the foregoing it will be seen that, in this improved tap, not only have the number of parts been reduced to a minimum for threading various diameters of pipe but the adjustment of the tap very much simplified. For instance when it is desired to change the length of the thread to be cut, it is only necessary to move the trip stop 42 by loosening the screw 43 while the adjustment for a diameter of ⅛″ is provided for by merely loosening the lock nut 57 and turning the nut 53.

Furthermore, the same body assembly may be used for a number of sizes.

On the tap shown in the drawings, we can thread a 6″ pipe (6⅝″ actual), 2″ length of thread up to 13⅜″ oil well casing, 5¾″ long thread.

The trip rings 41 have only to be changed for diameters varying more than ¼″.

Nose pieces are changed in order to eliminate overhang of the chaser blocks and are changed for approximately each 1″ variation in diameter—seven interchangeable nose pieces are used for 6⅝″ to 13⅜″. The core piece is changed so that the proper number of chasers can be used—

6 for 6⅝″ to 8⅛″
8 for 8⅝″ to 9⅝″
10 for 10¾″ to 13⅜″

The core pieces are also made larger in diameter for the larger pipe—three core pieces being used for 6⅝″ to 13⅜″

This improved tap can be used with either circular chasers or the flat-hobbed or milled chaser type.

It is to be understood that, by describing in detail herein any particular form, structure or arrangement it is not intended to limit the invention beyond the terms of the several claims or the requirements of the prior art.

Having thus explained the nature of our said invention and described a way of constructing and using the same, although without attempting to set forth all of the forms in which it may be made, or all of the modes of its use, we claim:

1. A tap comprising a housing, a body, a sleeve thereon shiftable axially with and independently of the body, a core shiftable relative to the body and having a tapered head, radially shiftable chasers carried by the body and connected with the tapered head, means pivotally connected with the sleeve and housing, and means connecting said means with the core and having pivotal connection with said first means spaced from its pivotal connection with the sleeve whereby on the stoppage of the forward travel of the housing, the core is retarded thereby to effect a tapered threading of the work.

2. A tap comprising a housing, a body, a sleeve thereon shiftable axially with and independently of the body, a core shiftable relative to the body and having a tapered head, radially shiftable chasers carried by the body and connected with the tapered head, means pivotally connected with the sleeve and housing, and means connecting said means with the core and having pivotal connection with said first means spaced from its pivotal connection with the sleeve whereby on the stoppage of the forward travel of the housing, the core is retarded thereby to effect a tapered threading of the work in the ratio of the difference between the space of the pivotal point of said first means with the sleeve and the pivotal point thereof with said second means.

3. A tap comprising a housing, a body, a sleeve thereon shiftable axially with and independently of the body, a core shiftable relative to the body and having a tapered head, radially shiftable chasers carried by the body and connected with the tapered head, means pivotally connected with the sleeve and housing, and means connecting said means with the core and having pivotal connection with said first means spaced from its pivotal connection with the sleeve whereby on the stoppage of the forward travel of the housing, the core is retarded thereby to effect a tapered threading of the work, all of said pivotal connections moving in parallel lines with the axis of the core.

4. A tap comprising a housing, a body, a sleeve thereon shiftable axially with and independently of the body, a core shiftable relative to the body and having a tapered head, radially shiftable chasers carried by the body and connected with the tapered head, means pivotally connected with the sleeve and housing, and means connecting said means with the core and having pivotal connection with said first means spaced from its pivotal connection with the sleeve whereby on the stoppage of the forward travel of the housing, the core is retarded thereby to effect a tapered threading of the work in the ratio of the difference between the space of the pivotal point of said first means with the sleeve and the pivotal point thereof with said second means, all of said pivotal connections moving in parallel lines with the axis of the core.

5. A tap comprising a housing, a body, a sleeve thereon shiftable axially with and independently of the body, a core shiftable relative to the body and having a tapered head, radially shiftable circular chasers carried by the body and connected with the tapered head, means pivotally connected with the sleeve and housing, and means connecting said means with the core and having pivotal connection with said first means spaced from its pivotal connection with the sleeve whereby on the stoppage of the forward travel of the housing, the core is retarded thereby to effect a tapered threading of the work.

6. A tap comprising a housing, a body, a sleeve thereon shiftable axially with and independently of the body, a core shiftable relative to the body and having a tapered head, radially shiftable chasers carried by the body and connected with the tapered head, means pivotally connected with the sleeve and adjustably pivotally connected with the housing, and means connecting said means with the core and having pivotal connection with said first means spaced from its pivotal connection with the sleeve whereby on the stoppage of the forward travel of the housing, the core is retarded thereby to effect a tapered threading of the work.

7. A tap comprising a housing, a body, a sleeve thereon shiftable axially with and independently of the body, a core shiftable relative to the body and having a tapered head, radially shiftable chasers carried by the body and connected with the tapered head, means pivotally connected with the sleeve and housing, and means connecting said means with the core and having spaced interchangeable pivotal connections with said first means spaced from its pivotal connection with the sleeve whereby on the stoppage of the forward travel of the housing, the core is retarded thereby to effect a tapered threading of the work.

8. A tap comprising a housing, a body, a sleeve thereon shiftable axially with and independently of the body, a core shiftable relative to the body and having a tapered head, radially shiftable chasers carried by the body and connected with the tapered head, means pivotally connected with the sleeve and housing, and means connecting said means with the core and having spaced interchangeable pivotal connections with said first means spaced from its pivotal connection with the sleeve whereby on the stoppage of the forward travel of the housing, the core is retarded thereby to effect a tapered threading of the work in the ratio of the difference between the space of the interchangeable pivotal point of said first means with the sleeve and the pivotal point thereof with the second means.

9. A tap comprising a housing, a body, a sleeve thereon shiftable axially with and independently of the body, a core shiftable relative to the body and having an interchangeable tapered head, radially shiftable blocks carried by the body and connected with the tapered head, chasers carried by the blocks, means pivotally connected with the sleeve and housing, and means connecting said means with the core and having pivotal connection with said first means spaced from its pivotal connection with the sleeve whereby on the stoppage of the forward travel of the housing, the pivotal connection of said first means with the sleeve and the core are retarded thereby to effect a tapered threading of the work.

10. A tap comprising a housing, a body, a sleeve thereon shiftable axially with and independently of the body, a core shiftable relative to the body and having a tapered head, radially shiftable chasers carried by the body and connected with the tapered head, a lever pivotally connected with the sleeve and housing and passing through the core, and arms connecting said lever with the core and having pivotal connection with said lever above and spaced from its pivotal connection with the sleeve whereby on the stoppage of the forward travel of the housing, the core will be retarded thereby to effect a tapered threading of the work.

11. A tap comprising a housing, a body, a sleeve thereon shiftable axially with and independently of the body, a core shiftable relative to the body and having a tapered head, radially shiftable chasers carried by the body and connected with the tapered head, a lever pivotally connected with the sleeve and housing and passing through the core, and arms connecting said lever with the core and having spaced interchangeable connections with said lever above and spaced from its pivotal connection with the sleeve whereby on the stoppage of the forward travel of the body, the core will be retarded thereby to effect a tapered threading of the work.

12. A tap comprising a housing, a body, a sleeve thereon shiftable axially with and independently of the body, a core shiftable relative to the body and having a tapered head, radially shiftable chasers carried by the body and connected with the tapered head, a lever pivotally connected with the sleeve and housing and passing through the core, and arms connecting said lever with the core and having spaced interchangeable connections with said lever above and spaced from its pivotal connection with the sleeve whereby on the stoppage of the forward travel of the housing, the core will be retarded thereby to effect a tapered threading of the work in the ratio of the difference between the space of the pivotal point of said lever with the sleeve and the interchangeable pivotal points thereof with the arms.

13. A tap comprising a housing, a body, a sleeve thereon shiftable axially with and independently of the body, a core shiftable relative to the body and having an interchangeable tapered head, radially shiftable blocks carried by the body and interlocked with the tapered head, circular chasers carried by the blocks, a lever pivotally connected with the sleeve and passing through the core and adjustably pivotally connected with the housing, and arms connecting said lever with the core and having spaced interchangeable pivotal connections above and spaced from the pivotal connection of said lever with the sleeve whereby on the stoppage of the forward travel of the housing, the pivotal connection of the lever with the sleeve and the core are retarded in the ratio of the difference between the space of the pivotal point of said lever with the sleeve and the pivotal points thereof with the arms, thereby to effect a tapered cutting of the thread, all of said pivotal connections moving in parallel lines with the axis of the core.

14. A tap comprising a housing, a body, a sleeve thereon shiftable axially with and independently of the body, a core shiftable relative to the body and having a tapered head, radially shiftable chasers carried by the body and connected with the tapered head, means pivotally connected with the sleeve and housing, means connecting said means with the core and having pivotal connection with said first means spaced from its pivotal connection with the sleeve whereby on the stoppage of the forward travel of the housing the core is retarded thereby to effect a tapered threading of the work, and means for collapsing the chasers away from the thread.

15. A tap comprising a housing, a body, a sleeve thereon shiftable axially with and independently of the body, a core shiftable relative to the body and having a tapered head, radially shiftable chasers carried by the body and connected with the tapered head, means pivotally connected with the sleeve and housing, means connecting said means with the core. and having pivotal connection with said first means spaced from its pivotal connection with the sleeve whereby on the stoppage of the forward travel of the housing the core is retarded thereby to effect a tapered threading of the work, and adjustable means for collapsing the chasers away from the thread and adjustable to permit the cutting of various lengths of thread.

16. A tap comprising a housing, a body, a sleeve thereon shiftable axially with and independently of the body, a core shiftable relative to the body and having a tapered head, radially shiftable chasers carried by the body and connected with the tapered head, means pivotally connected with the sleeve and housing, means connecting said means with the core and having pivotal connection with said first means spaced from its pivotal connection with the sleeve whereby on the stoppage of the forward travel of the housing the core is retarded thereby to effect a tapered threading of the work, and adjustable means for collapsing the chasers away from the thread and adjustable to permit the cutting of various lengths of thread, said means comprising an adjustable trip dog carried by the housing, a sliding plunger having means co-operating with said trip dog, and spring actuated means carried by the body and co-operating with said plunger.

17. A tap comprising a housing, a body, a sleeve thereon shiftable axially with and independently of the body, a core shiftable relative to the body and having a tapered head, radially shiftable chasers carried by the body and connected with the tapered head, means pivotally connected with the sleeve and housing, means connecting said means with the core and having pivotal connection with said first means spaced from its pivotal connection with the sleeve whereby on the stoppage of the forward travel of the housing the core is retarded thereby to effect a tapered threading of the work, and means for adjusting the diameter of the tap.

18. A tap comprising a housing, a body, a sleeve thereon shiftable axially with and independently of the body, a core shiftable relative to the body and having a tapered head, radially shiftable chasers carried by the body and connected with the tapered head, means pivotally connected with the sleeve and housing, means connecting said means with the core and having pivotal connection with said first means spaced from its pivotal connection with the sleeve whereby on the stoppage of the forward travel of the housing the core is retarded thereby to effect a tapered threading of the work, and means for adjusting the diameter of the tap and comprising a threaded adjusting ring mounted on the sleeve.

19. A tap comprising a housing, a body, a sleeve thereon shiftable axially with and independently of the body, a core shiftable relative to the body and having a tapered head, radially shiftable chasers carried by the body and connected with the tapered head, means pivotally connected with the sleeve and housing, means connecting said means with the core and having pivotal connection with said first means spaced from its pivotal connection with the sleeve whereby on the stoppage of the forward travel of the housing the core is retarded thereby to effect a tapered threading of the work, and means for resetting the tap.

20. A tap comprising a housing, a body, a sleeve thereon shiftable axially with and independently of the body, a core shiftable relative to the body and having an interchangeable tapered head, radially shiftable blocks carried by the body and interlocked with the tapered head, circular chasers carried by the blocks, a lever pivotally connected with the sleeve and passing through the core and adjustably pivotally connected with the housing, arms connecting said lever with the core and having spaced interchangeable pivotal connections above and spaced from the pivotal connection of said lever with the sleeve whereby on the stoppage of the forward travel of the housing the pivotal connection of the lever with the sleeve and the core are retarded in the ratio of the difference between the space of the pivotal point of said lever with the sleeve and the pivotal points thereof with the arms, thereby to effect a tapered cutting of the thread, all of said pivotal connections moving in parallel lines with the axis of the core, means for collapsing the chasers away from the thread, means for adjusting the diameter of the tap, and means for resetting the tap.

21. A tap comprising an axially shiftable core having a tapered head, a sleeve, a sleeve comprising a body and a head located between said first sleeve and the core, radially shiftable chasers carried by the head of the body and connected with the tapered head of the core, means having remote spaced pivotal connections, one of such pivotal connections being with said first sleeve, and means connecting said means with the core and having pivotal connection with said first means spaced from its pivotal connection with the sleeve whereby, on the stoppage of the forward travel of one of its spaced pivotal connections, the core is retarded, thereby to effect a tapered threading of the work.

22. A tap comprising an axially shiftable core having a tapered head, a sleeve, a sleeve comprising a body and a head located between said first sleeve and the core, radially shiftable chasers carried by the head of the body and connected with the tapered head of the core, means having remote spaced pivotal connections, one of such pivotal connections being with said first sleeve, and means connecting said means with the core and having an adjustable pivotal connection with said first means spaced from its pivotal connection with the sleeve whereby, on the stoppage of the forward travel of one of its spaced pivotal connections, the core is retarded thereby to effect a tapered threading of the work, in the ratio of the difference between the space of the pivotal point of said first means with the sleeve and the pivotal point thereof with said second means.

23. A tap comprising an axially shiftable core having a tapered head, a sleeve, a sleeve comprising a body and a head located between said first sleeve and the core, radially shiftable chasers carried by the head of the body and connected with the tapered head of the core, means having remote spaced adjustable pivotal connections, one of such pivotal connections being with said first sleeve, and means connecting said means with the core and having pivotal connection with said first means spaced from its pivotal connection with the sleeve whereby, on the stoppage of the forward travel of one of its spaced pivotal connections, the core is retarded, thereby to effect a tapered threading of the work.

ALFRED E. DRISSNER.
WILLIAM J. HOGG.